US 9,547,372 B2

(12) United States Patent
Saito

(10) Patent No.: US 9,547,372 B2
(45) Date of Patent: Jan. 17, 2017

(54) IMAGE PROCESSING DEVICE AND HEAD MOUNTED DISPLAY APPARATUS INCLUDING THE SAME

(71) Applicant: SEIKO EPSON CORPORATION, Tokyo (JP)

(72) Inventor: Hitoshi Saito, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 104 days.

(21) Appl. No.: 14/466,689

(22) Filed: Aug. 22, 2014

(65) Prior Publication Data
US 2015/0062165 A1 Mar. 5, 2015

(30) Foreign Application Priority Data

Aug. 29, 2013 (JP) ................................. 2013-177861

(51) Int. Cl.
*G09G 5/00* (2006.01)
*G06F 3/01* (2006.01)
(Continued)

(52) U.S. Cl.
CPC ............. *G06F 3/017* (2013.01); *G02B 27/017* (2013.01); *G02B 27/0172* (2013.01);
(Continued)

(58) Field of Classification Search
CPC ........ G06T 19/006; G06T 19/00; G06F 3/011; G06F 3/012; G02B 27/017
(Continued)

(56) References Cited

U.S. PATENT DOCUMENTS 5,327,260 A * 7/1994 Shimomae ......... G06K 15/1223
358/445
6,563,537 B1 * 5/2003 Kawamura ............ H04N 9/045
348/222.1
(Continued)

FOREIGN PATENT DOCUMENTS

JP  A-2010-146481  7/2010
WO  WO 2010/073928 A1  7/2010

OTHER PUBLICATIONS

Lee et al., "Handy AR: Markerless Inspection of Augmented Reality Objects Using Fingertip Tracking."
(Continued)

*Primary Examiner* — Ke Xiao
*Assistant Examiner* — Gordon Liu
(74) *Attorney, Agent, or Firm* — Oliff PLC

(57) ABSTRACT

When a hand of the user is recognized in an image pickup region of a camera, a head mounted display stores a contour shape of the hand which would be imaged by the camera in advance. In addition, the head mounted display receives an input of image data per pixel included in the camera, calculates a difference between colors of adjacent pixels represented by the image data, sets a set of image data having the same color system, where the calculated difference is within a predetermined threshold, as a group, and captures a contour of a region of the data. Next, the head mounted display compares the captured contour to a contour shape of the hand which is stored in advance to allow the user to recognize the hand of the user in the image pickup region.

11 Claims, 12 Drawing Sheets

(51) Int. Cl.
G02B 27/01 (2006.01)
G06K 9/00 (2006.01)
G06K 9/62 (2006.01)

(52) U.S. Cl.
CPC ..... *G06K 9/00375* (2013.01); *G06K 9/00671* (2013.01); *G06K 9/6204* (2013.01); *G02B 2027/014* (2013.01); *G02B 2027/0138* (2013.01); *G02B 2027/0178* (2013.01)

(58) Field of Classification Search
USPC .......................................... 345/633
See application file for complete search history.

(56) References Cited

U.S. PATENT DOCUMENTS

| 2002/0089413 | A1* | 7/2002 | Heger ............... G06F 21/32 340/5.82 |
| 2012/0229509 | A1* | 9/2012 | Liu ................... G06F 3/011 345/633 |
| 2013/0120250 | A1* | 5/2013 | Lin ................... G06F 3/011 345/157 |
| 2014/0253429 | A1* | 9/2014 | Dai ................... G06F 3/017 345/156 |
| 2015/0309316 | A1* | 10/2015 | Osterhout .......... G02B 27/0172 345/8 |

OTHER PUBLICATIONS

Yuan et al., "Robust Hand Tracking Using a Simple Color Classification Technique," *The International Journal of Virtual Reality*, 2009, vol. 8 No. 2, pp. 7-12.

* cited by examiner

IMAGE PROCESSING DEVICE AND HEAD MOUNTED DISPLAY APPARATUS INCLUDING THE SAME

BACKGROUND

1. Technical Field

The present invention relates to an image processing device and a head mounted display apparatus including the same.

2. Related Art

A technique called Augmented Reality (AR) for adding information to a real environment and presenting the information using a computer is known. A technique for realizing such augmented reality is applied to not only head mounted display (HMD) apparatuses (for example, refer to JP-A-2010-146481) but image processing devices (for example, refer to "Handy A R: Markerless Inspection of Augmented Reality Objects Using Fingertip Tracking") which display an image on the existing displays other than HMDs. The HMD disclosed in JP-A-2010-146481 allows the user to visually recognize a virtual panel formed by augmented reality as a virtual image and associates a position and a movement of a hand of the user with the virtual panel. Therefore, a technique for recognizing the hand of the user is necessary, and such hand recognition techniques are disclosed in "Handy A R: Markerless Inspection of Augmented Reality Objects Using Fingertip Tracking" and "The international Journal of Virtual Reality, 2009, 8(2): 7-12 Robust Hand Tracking Using a Simple Color Classification Technique".

In "Handy A R: Markerless Inspection of Augmented Reality Objects Using Fingertip Tracking" and "The international Journal of Virtual Reality, 2009, 8(2): 7-12 Robust Hand Tracking Using a Simple Color Classification Technique", when a hand of the user imaged by a camera is recognized, the color of the hand is defined in advance as a model color of the skin, a region of a color which matches with the defined model color is separated from the other regions, and the shape of this separated region is recognized as the hand of the user. Accordingly, the recognition accuracy of the hand of the user can be secured to some extent by increasing the model color of the skin defined as the color of the hand of the user or by providing a certain margin to a value of the matching determination. However, an image pickup state of the hand of the user may vary. For example, there are many cases where the illuminance around the hand of the user may be rapidly changed depending on changes in outside weather conditions at that time, changes in the irradiation state of the sunlight, the glare of reflected light or shadow, and the like. In such cases, the color of the hand does not match with the model color, which may decrease the recognition accuracy of the hand of the user. In a room, the above-described phenomenon may occur depending on illumination conditions. In addition, the color of the hand of the user varies depending on the race of a person and the individual people. Therefore, whenever the color of the hand of the user cannot be recognized, it is necessary that the model color, which is the reference for recognizing the hand of the user, be newly defined according to the color of the hand of the user. As a result, convenience deteriorates. Moreover, even when the model color is newly defined, the recognition accuracy may be decreased due to rapid changes in illuminance. Therefore, in head mounted displays and image processing devices to which augmented reality (AR) is applied, it has been required that the recognition accuracy of the hand of the user be increased. In addition, improvement in the versatility of a technique for detecting a hand of the user, reduction in cost thereof, and the like have been also desired.

SUMMARY

An advantage of some aspects of the invention is to solve at least a part of the problems described above and the invention can be implemented as the following forms.

(1) An aspect of the invention provides an image processing device. This image processing device recognizes a hand of user in an image pickup region of a camera which picks up an image of a front side of the user, the device including: a difference calculating unit that receives an input of a picked-up image composed of a plurality of data included in the camera, calculates a difference between the data of the picked-up image, and executes the difference calculation between the data in at least a part of the image pickup region; a capturing unit that captures a shape of a region, where the difference calculated by the difference calculating unit is within a predetermined threshold, as a recognition target shape; a storing unit in which a contour shape of the hand is stored in advance as a comparative shape of the captured recognition target shape; and a recognizing unit that compares the recognition target shape captured by the capturing unit to the contour shape stored in the storing unit and recognizes the captured recognition target shape as the hand of the user in the image pickup region based on a comparison result.

In the image processing device according to this aspect of the invention, when the hand of the user is recognized, a shape of a region, where the difference between the data in the picked-up image of the hand is within a predetermined threshold, is captured as a recognition target shape, the captured recognition target shape is compared to the stored contour shape of the hand, and the hand of the user is recognized based on a comparison result. Accordingly, according to the image processing device with the above-described configuration, it is not necessary that the model color which is the reference for recognizing the hand of the user be defined for each color of the hand. Therefore, when the hand of the user is recognized, convenience does not deteriorate. In addition, a difference between colors of the pick-up image is a difference between data of the picked-up image. Even when the illuminance around the hand of the user is rapidly changed, the data which are a target for the difference calculation are substantially equally affected by such rapid change in illuminance. Therefore, the difference between the data of the picked-up image is not affected that much by the rapid change in illuminance around the hand of the user. Accordingly, according to the image processing device with the above-described configuration, a decrease in the recognition accuracy of the hand by the rapid change in illuminance can be suppressed, and the recognition accuracy can be improved. In addition, the contour shape of the hand which is compared to the captured recognition target shape is not particularly limited as long as it is expected to be used in the image pickup region by the user for a purpose. It is not necessary that the stored contour shape of the hand be limited to some extent and be newly set depending on the race of a person and the individual users. From this point of view, according to the image processing device with the above-described configuration, when the hand of the user is recognized, convenience does not deteriorate, and the versatility of the technique for detecting a hand of the user is improved, and the cost thereof can be reduced.

(2) In the image processing device according to the aspect of the invention described above, the difference calculating unit may calculate the difference of the picked-up image as a difference in pixel value between adjacent pixels constituting the picked-up image, and the capturing unit may capture a shape of a region, where the difference in pixel value between the adjacent pixels is within a predetermined threshold, as the recognition target shape. With this configuration, when the hand of the user is recognized, a shape of a region, where the difference in pixel value between adjacent pixels in the picked-up image of the hand of the user is within a predetermined threshold, is captured as a recognition target shape, the captured recognition target shape is compared to the stored contour shape of the hand, and the hand of the user is recognized based on a comparison result. Accordingly, according to the image processing device with the above-described configuration, it is not necessary that the model color which is the reference for recognizing the hand of the user be defined for each color of the hand. Therefore, when the hand of the user is recognized, convenience does not deteriorate. In addition, a difference in color between adjacent pixels is a difference in pixel value between adjacent pixels. Even when the illuminance around the hand of the user is rapidly changed, the respective pixels are substantially equally affected by the rapid change during the calculation of the difference in pixel value. Therefore, as described above, a decrease in the recognition accuracy of the hand by the rapid change in illuminance can be reliably suppressed, and the recognition accuracy can be improved. In addition, as described above, it is not necessary that the stored contour shape of the hand be limited to some extent and be newly set depending on the race of a person and the individual users. Therefore, when the hand of the user is recognized, convenience does not deteriorate, and the versatility of the technique for detecting a hand of the user can be improved, and the cost thereof can be reduced.

(3) In the image processing device according to the aspect of the invention described above, the difference calculating unit may execute the calculation of the difference in color between the adjacent pixels on the divided regions in an execution order determined for each of divided regions into which the image pickup region is divided in advance. With this configuration, the following advantageous effects can be obtained. Typically, the user puts the dominant hand into the image pickup region of the camera on the side seen from the user. Therefore, when the dominant hand is the right hand, the user puts the hand from the right side of the image pickup region or from the lower side of the image pickup region. When the dominant hand is the left hand, the user puts the hand from the left side of the image pickup region or from the lower side of the image pickup region. Accordingly, according to the image processing device with this configuration, by associating the execution order determined for each divided region with the operation of putting the hand into the image pickup region, the hand of the user can be rapidly recognized.

(4) In the image processing device according to the aspect of the invention described above, the divided regions may be a left end region, a right end region, a lower end region, a residual region of the image pickup region, and the difference calculation unit executes the difference calculation first on any one of the left end region, the right end region, and the lower end region. With this configuration, the hand of the user can be more rapidly recognized.

(5) In the image processing device according to the aspect of the invention described above, the difference calculating unit may calculate a difference between values of the adjacent pixels, which are obtained by color-converting pixel data constituting the picked-up image, as the difference in pixel value between the adjacent pixels. The value obtained by the color conversion of the image data is separated from the brightness affected by the illuminance around the imaged hand of the user during the color conversion. Accordingly, according to the image processing device with this configuration, a decrease in the recognition accuracy by the rapid change in illuminance can be suppressed with high effectiveness, and the recognition accuracy of the hand can be further increased.

(6) Another aspect of the invention provides a head mounted display apparatus. In this head mounted display apparatus, a virtual image and an outside scene overlap each other and can be visually recognized by a user, the apparatus including: an augmented-reality processing unit that generates image data for displaying the virtual image and allows the user to visually recognize the virtual image such that the virtual image is displayed in a visual field of the user based on the generated image data; the image processing device according to any one of the above-described configurations; and the camera that can pick up an image of the hand of the user. In the head mounted display apparatus, the augmented-reality processing unit may allow the user to visually recognize the virtual image in a display region corresponding to the image pickup region, and when the recognizing unit of the image processing device recognizes the hand of the user in the image pickup region, the augmented-reality processing unit may generate the image data for displaying the virtual image, which is embedded with a partial hand image corresponding to at least a part of the recognized hand of the user, and may update a position of the partial hand image in the display region of the virtual image based on a position of the part of the hand in the image pickup region. According to the head mounted display apparatus with this configuration, the user can visually recognize the virtual image including the partial hand image in a state where the user recognizes the hand using the image processing device. Therefore, the user can recognize a correspondence between the hand of the user and the partial hand image of the virtual image. Moreover, the user can visually recognize the partial hand image which moves along the hand in the virtual image when the hand is moved. Therefore, the hand of the user can be used for a command operation, and thus convenience can be improved.

(7) in the head mounted display apparatus according to the aspect of the invention described above, the augmented-reality processing unit may generate the image data such that the virtual image including the partial hand image is displayed through the hand of the user positioned inside the image pickup region of the camera. According to the head mounted display apparatus with this configuration, the user can recognize the hand which overlap the virtual image. Therefore, when the hand of the user is moved, the recognition of the partial hand image can be improved.

(8) The head mounted display apparatus according to the aspect of the invention described above may further include a head behavior detecting sensor that detects behavior of the head of the user, in which the difference calculating unit of the image processing device may receive an input of image pickup data per pixel included in the camera in a state where a movement of the head detected by the head behavior detecting sensor is cancelled. With this configuration, the recognition target shape where the difference in color between adjacent pixels is within a predetermined threshold can be accurately captured without depending on the movement of the head of the user. Therefore, the recognition accuracy of the hand of the user can be increased.

All the above-described plural components included in each aspect of the invention are not essential. For a part of the plural components, modifications, deletions, substitutions with new components, and partial deletions of the limitations can be appropriately made to solve a part or all the above-described problems or to achieve a part or all the effects described in this specification. In addition, in order to solve a part or all the above-described problems or to achieve a part or all the effects described in this specification, an independent aspect of the invention can be made by combining a part or all of the technical features included in another aspect of the invention with the technical features included in another aspect of the invention.

For example, one aspect of the invention is an image processing device including a storing unit, a difference calculating unit, and a recognizing unit and can be implemented, for example, as a head mounted display apparatus, but can also be implemented as another apparatus other than the head mounted display apparatus. In addition, the invention can be implemented in various forms. For example, the invention can also be implemented in forms of a control method for the image processing device, a control method for the head mounted display apparatus, a head mounted display system, a computer program for implementing functions of the method, the apparatus, or the system, a recording medium on which the computer program is recorded, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Embodiments

A-1. Configuration of Head Mounted Display Apparatus

Figure 1:
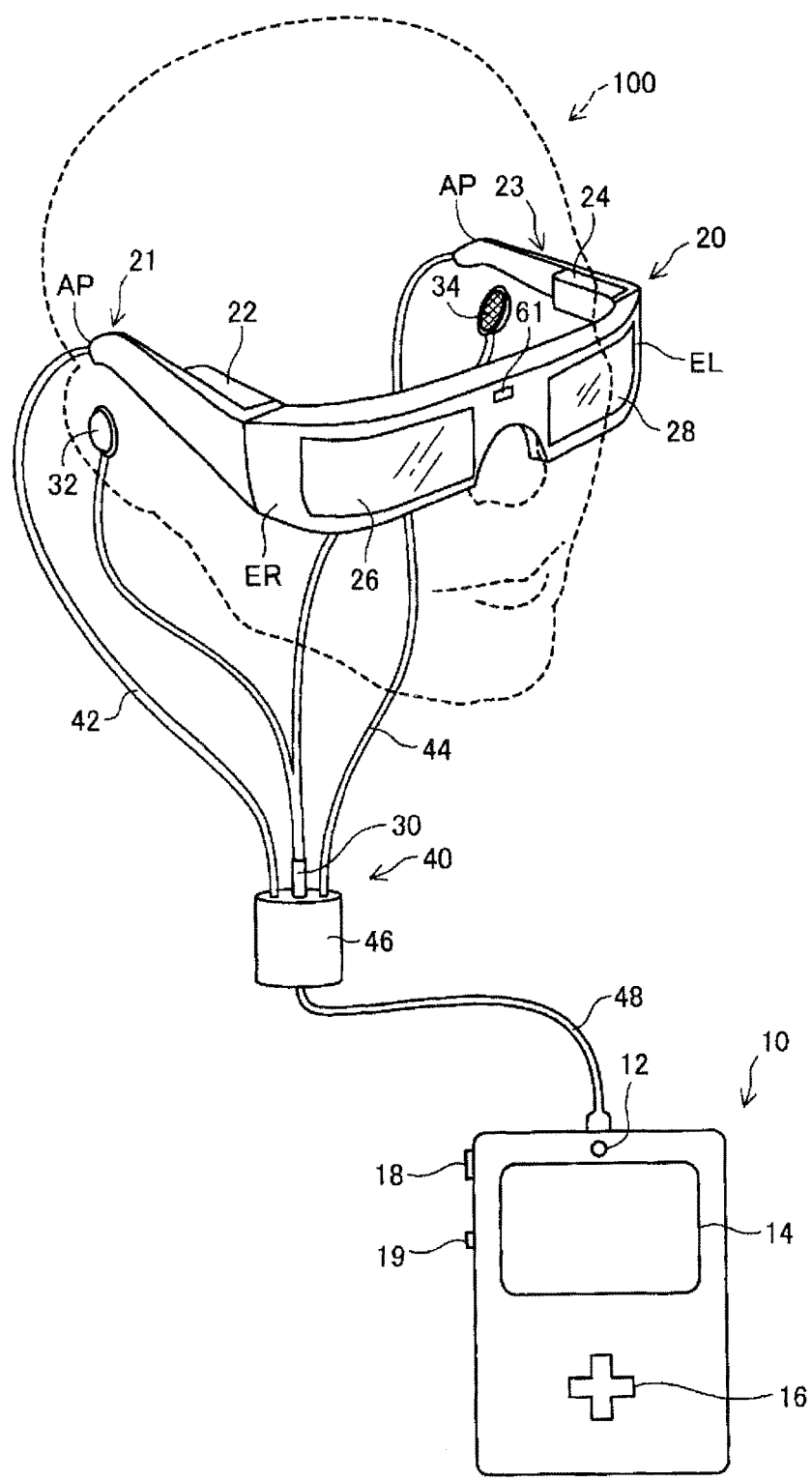
FIG. 1 is a diagram illustrating a schematic configuration of a head mounted display apparatus according to an embodiment of the invention.

FIG. 1 is a diagram illustrating a schematic configuration of a head mounted display apparatus according to an embodiment of the invention. A head mounted display apparatus 100 is worn on the head and hereinafter will also be referred to as "head mounted display 100". The head mounted display 100 according to the embodiment is an optically transmissive head mounted display apparatus with which the user can visually recognize a virtual image and can visually recognize an outside scene directly at the same time.

The head mounted display 100 includes: an image display unit 20 that allows the user to visually recognize a virtual image in a state of being worn on the head of the user; and a control unit (controller) 10 that controls the image display unit 20.

The image display unit 20 is a wearing body that is worn on the head of the user and has an eyeglass shape in this embodiment. The image display unit 20 includes a right holding unit 21, a right display driving unit 22, a left holding unit 23, a left display driving unit 24, a right optical-image display unit 26, a left optical-image display unit 28, and a camera 61. The right optical-image display unit 26 and the left optical-image display unit 28 are arranged to be positioned before the right and left eyes of the user when the user wears the image display unit 20. An end of the right optical-image display unit 26 and an end of the left optical-image display unit 28 are connected to each other in a position corresponding to the middle of the forehead of the user when the user wears the image display unit 20.

The right holding unit 21 extends from an end ER, which is the other end of the right optical-image display unit 26, to a position corresponding to the temple of the user when the user wears the image display unit 20. Likewise, the left holding unit 23 extends from an end EL, which is the other end of the left optical-image display unit 28, to a position corresponding to the temple of the user when the user wears the image display unit 20. The right holding unit 21 and the left holding unit 23 hold the image display unit 20 on the head of the user as in the temples of glasses.

The right display driving unit 22 is arranged inside the right holding unit 21, that is, on a side opposite the head of the user when the user wears the image display unit 20. In addition, the left display driving unit 24 is arranged inside the left holding unit 23. Hereinafter, the right holding unit 21 and the left holding unit 23 will be collectively referred to simply as "holding unit", the right display driving unit 22 and the left display driving unit 24 will be collectively referred to simply as "display driving unit", and the right optical-image display unit 26 and the left optical-image display unit 28 will be collectively referred to as "optical-image display unit".

The display driving unit includes liquid crystal displays 241 and 242 (hereinafter, referred to as "LCD") and projection optical systems 251 and 252 (refer to FIG. 2). The details of a configuration of the display driving unit will be described below. The optical-image display unit as an optical member includes light guide plates 261 and 262 (refer to FIG. 2) and a dimming plate. The light guide plates 261 and 262 are formed of an optically transparent resin material or the like and guide image light, which is output from the display driving unit, to the eyes of the user. The dimming plate is an optical member having a thin plate shape and is arranged to cover the front side (side opposite the eyes of the user) of the image display unit 20. The dimming plate protects the light guide plates 261 and 262 and suppresses damages to the light guide plates 261 and 262, adhesion of stains, and the like. In addition, by adjusting light transmittance of the dimming plate, the intensity of external light entering the eyes of the user can be adjusted and the easiness of the visual recognition of a virtual image can be adjusted. The dimming plate is not necessarily provided.

The camera 61 is arranged in a position corresponding to the middle of the forehead of the user when the user wears the image display unit 20. The camera 61 picks up an image of an outside scene (scene on the outside) in a front side direction of the image display unit 20, that is, in a visual field direction of the user wearing the head mounted display 100. The camera 61 is a so-called visible light camera and includes an imaging device such as a charge coupled device (CCD) or a complementary metal-oxide semiconductor (CMOS). An outside scene image acquired by the camera 61 is an image indicating the shape of an object from visible light radiated from the object. In the embodiment, the camera 61 may be a monocular camera or a stereo camera. In addition, an installation position of the camera 61 is not limited to the middle of the forehead of the user and may be the end EL or the end ER of the image display unit 20.

The image display unit 20 further includes a connecting unit 40 for connecting the image display unit 20 to the control unit 10. The connecting unit 40 includes a main body cord 48 that is connected to the control unit 10, a right cord 42 and left cord 44 that are branched from the main body cord 48, and a coupling member 46 that is provided in a branching point. The right cord 42 is inserted from a distal end AP of the right holding unit 21 in the extending direction thereof to the inside of a housing of the right holding unit 21 and is connected to the right display driving unit 22. Likewise, the left cord 44 is inserted from a distal end AP of the left holding unit 23 in the extending direction thereof to the inside of a housing of the left holding unit 23 and is connected to the left display driving unit 24. The coupling member 46 is provided with a jack for connecting an earphone plug 30 thereto. A right earphone 32 and a left earphone 34 extend from the earphone plug 30.

The image display unit 20 and the control unit 10 transmit various signals through the connecting unit 40. An end of the main body cord 48 opposite the coupling member 46 and the control unit 10 are provided with connectors (not illustrated) which are fitted to each other. The control unit 10 and the image display unit 20 are connected and disconnected by establishing and releasing the fitting between the connector of the main body cord 48 and the connector of the control unit 10. For the right cord 42, the left cord 44, and the main body cord 48, for example, a metal cable or an optical fiber can be adopted.

The control unit 10 controls the head mounted display 100. The control unit 10 includes a lighting unit 12, a touch pad 14, a cross key 16, and a power switch 18. The lighting unit 12 notifies the user of the operation state (for example, ON and OFF of a power supply) of the head mounted display 100 through a lighting state thereof. As the lighting unit 12, for example, a light emitting diode (LED) can be used. The touch pad 14 detects a contact manipulation on a manipulation surface of the touch pad 14 and outputs a signal according to detected content. For the touch pad 14, various types of touch pads such as capacitive, pressure-sensitive, or optical touch pads can be adopted. The cross key 16 detects a manipulation of pressing keys corresponding to up, down, left, and right directions and outputs a signal according to detected content. The power switch 18 detects a manipulation of sliding the switch to switch a power status of the head mounted display 100.

Figure 2:
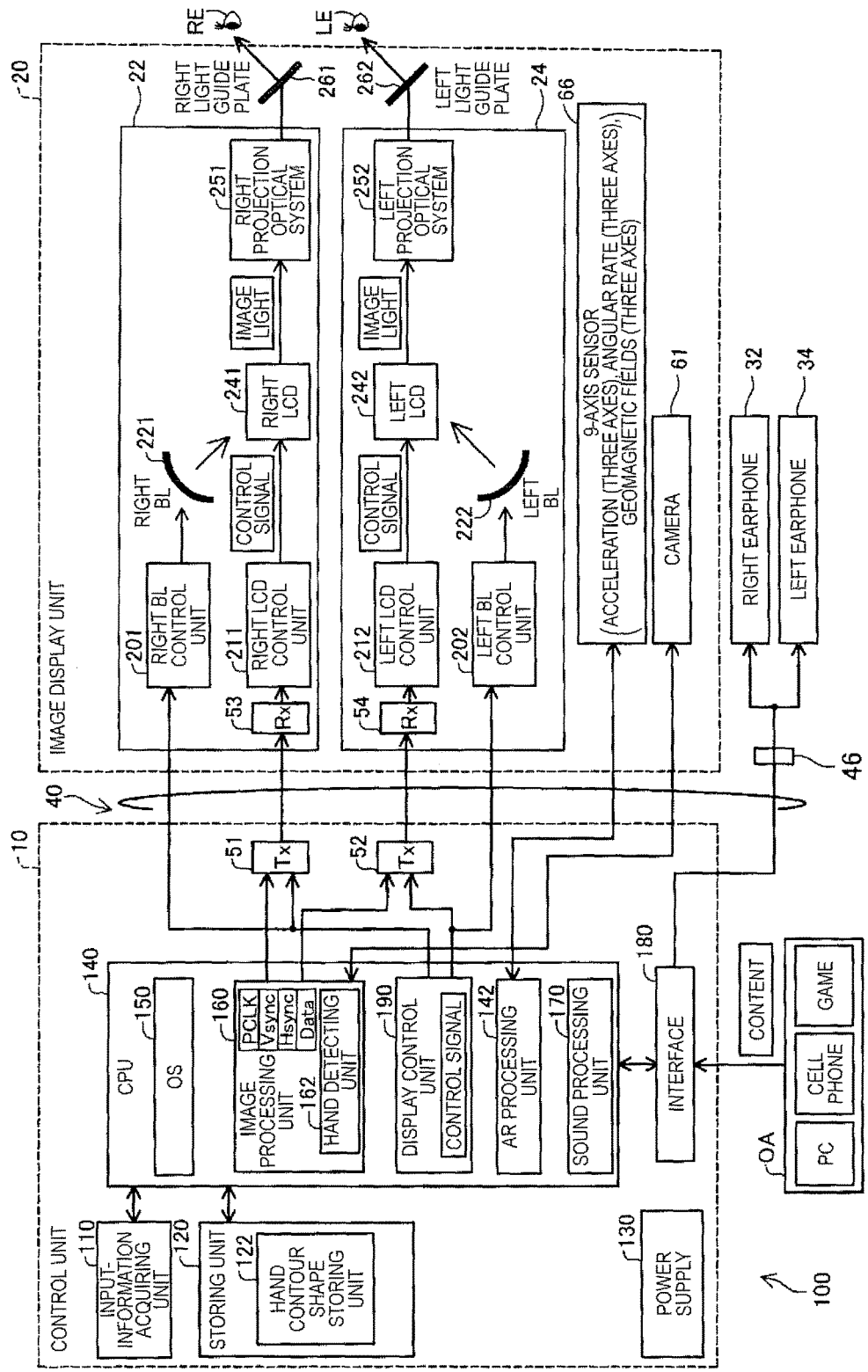
FIG. 2 is a block diagram functionally illustrating a configuration of the head mounted display.

FIG. 2 is a block diagram functionally illustrating a configuration of the head mounted display 100. The control unit 10 includes an input-information acquiring unit 110, a storing unit 120, a power supply 130, a radio communication unit 132, a GPS module 134, a CPU 140, an interface 180, and transmitting units (Tx) 51 and 52. The units are connected to one another through a bus (not illustrated).

The input-information acquiring unit 110 acquires a signal corresponding to an manipulation input to, for example, the touch pad 14, the cross key 16, and the power switch 18. The storing unit 120 is configured of a ROM, a RAM, a DRAM, a hard disk, or the like. The storing unit 120 includes a hand contour shape storing unit 122. The details will be described below. The power supply 130 supplies power to the respective units of the head mounted display 100. As the power supply 130, for example, a secondary battery can be used.

The CPU 140 reads a computer program stored in the storing unit 120 and executes the computer program to function as an operating system (OS) 150, an image processing unit 160, a sound processing unit 170, a display control unit 190, and an AR processing unit 142. The AR processing unit 142 is triggered by an processing start request from the OS 150 or an specific application to execute processing for implementing augmented reality (hereinafter, also referred to as "augmented reality processing"). The details will be described below. The AR processing unit 142 corresponds to "the augmented-reality processing unit" in the appended claims.

The image processing unit 160 generates a signal based on content (image) input through the interface 180. The image processing unit 160 supplies the generated signal to the image display unit 20 through the connecting unit 40. The signal which is supplied to the image display unit 20 varies depending on whether the content is analog content or digital content. In the case of the analog content, the image processing unit 160 generates and transmits a clock signal PLCK, a vertical synchronization signal VSync, a horizontal synchronization signal HSync, and image data Data. Specifically, the image processing unit 160 acquires an image signal contained in the content. For example in the case of a moving image, the acquired image signal is generally an analog signal formed of 30 frame images per second. The image processing unit 160 separates synchronization signals such as the vertical synchronization signal VSync and the horizontal synchronization signal HSync from the acquired image signal to generate the clock signal PCLK using a PLL circuit or the like according to a period of the synchronization signals. The image processing unit 160 converts the analog signal, from which the synchronization signals are separated, into a digital image signal using an A/D conversion circuit or the like. The image processing unit 160 stores the converted digital image signal in the DRAM of the storing unit 120 frame by frame as image data Data of RGB data. On the other hand, in the case of the digital content, the image processing unit 160 generates and transmits the clock signal POLK and image data Data. Specifically, in the case of the digital content, since the clock signal PCLK is output in synchronization with an image signal, the generation of the vertical synchronization signal VSync and the horizontal synchronization signal HSync and the A/D conversion of the analog image signal are unnecessary. The image processing unit 160 may execute image processing including resolution conversion processing, various color tone corrections such as adjustment of brightness and saturation, and keystone correction on the image data Data stored in the storing unit 120.

The image processing unit 160 transmits the clock signal PCLK, the vertical synchronization signal VSync, the horizontal synchronization signal HSync, and the image data Data stored in the DRAM of the storing unit 120 through the transmitting units 51 and 52. The image data Data transmitted through the transmitting unit 51 will also be referred to as "image data for right eye Data1", and the image data Data transmitted through the transmitting unit 52 will also be referred to as "image data for left eye Data2". The transmitting units 51 and 52 function as a transceiver for serial transmission between the control unit 10 and the image display unit 20.

The image processing unit 160 includes a hand detecting unit 162 to participate in recognizing a hand of the user in addition to the above-described processing. Specifically, the hand detecting unit 162 of the image processing unit 160 receives an input of image pickup data obtained from each pixel of the camera 61 and executes various processes in the order of the hand recognition processing of FIG. 6 described below, the processes including: calculation of a difference between colors of adjacent pixels represented by the image pickup data; the capturing of a shape formed by sets of image pickup data in which the difference between colors of adjacent pixels is within a predetermined threshold; and determination on whether or not the captured shape is the shape of the hand of the user. Accordingly, the hand detecting unit 162 constitutes "the difference calculating unit", "the capturing unit", and "the recognizing unit" in the appended claims during the hand recognition processing of FIG. 6.

The display control unit 190 generates control signals for controlling the right display driving unit 22 and the left display driving unit 24. Specifically, the display control unit 190 individually controls, according to the control signals, ON/OFF of driving of the right LCD 241 by a right LCD control unit 211, ON/OFF of driving of a right backlight 221 by a right backlight control unit 201, ON/OFF of driving of a left LCD 242 by a left LCD control unit 212, ON/OFF of driving of a left backlight 222 by a left backlight control unit 202, and the like to thereby control generation and emission of image light by each of the right display driving unit 22 and the left display driving unit 24. For example, the display control unit 190 causes both of the right display driving unit 22 and the left display driving unit 24 to generate image light, causes only one of the display driving units to generate image light, or causes neither of the display driving units to generate image light. In addition, the display control unit 190 transmits the control signals for the right LCD control unit 211 and the left LCD control unit 212 respectively through the transmitting units 51 and 52. The display control unit 190 transmits the control signals for the right backlight control unit 201 and the left backlight control unit 202 respectively through the transmitting units 51 and 52.

The sound processing unit 170 acquires a sound signal included in the content, amplifies the acquired sound signal, and supplies the sound signal to a speaker (not illustrated) in the right earphone 32 connected to the coupling member 46 and a speaker (not illustrated) in the left earphone 34 connected to the coupling member 46. For example, when a Dolby (registered trademark) system is adopted, sound signal processing is performed and different sounds having, for example, varied frequencies or the like are output from the right earphone 32 and the left earphone 34, respectively.

The interface 180 connects various external apparatuses OA, which are supply sources of the content, to the control unit 10. Examples of the external apparatuses OA include a personal computer, a cell phone, and a game terminal. As the interface 180, for example, an USB interface, a micro USB interface, or a memory card interface can be used.

The image display unit 20 includes the right display driving unit 22, the left display driving unit 24, the right light guide plate 261 functioning as the right optical-image display unit 26, the left light guide plate 262 functioning as the left optical-image display unit 28, the camera 61, and a 9-axis sensor 66.

The 9-axis sensor 66 is a motion sensor for detecting acceleration (three axes), angular rate (three axes), and geomagnetic fields (three axes). The 9-axis sensor 66 is provided in the image display unit 20 and thus functions as a movement detecting unit for detecting movement of the head of the user when the image display unit 20 is worn on the head of the user. The movement of the head includes changes in the speed, the acceleration, the angular rate, and the direction of the head.

The right display driving unit 22 includes a receiving unit (Rx) 53, the right backlight (BL) control unit 201 and the right backlight (EL) 221 that function as a light source, the right LCD control unit 211 and the right LCD 241 that function as a display element, and the right projection optical system 251. The right backlight control unit 201, the right LCD control unit 211, the right backlight 221, and the right LCD 241 will also be collectively referred to as "image-light generating unit".

The receiving unit 53 functions as a receiver for serial transmission between the control unit 10 and the image display unit 20. The right backlight control unit 201 drives the right backlight 221 based on an input control signal. The right backlight 221 is a light-emitting body such as an LED or an electroluminescence (EL). The right LCD control unit 211 drives the right LCD 241 based on the clock signal PCLK, the vertical synchronization signal VSync, the horizontal synchronization signal HSync, and the image data for right eye Data1 which are input through the receiving unit 53. The right LCD 241 is a transmissive liquid crystal panel in which multiple pixels are arranged in a matrix shape.

Figure 3:
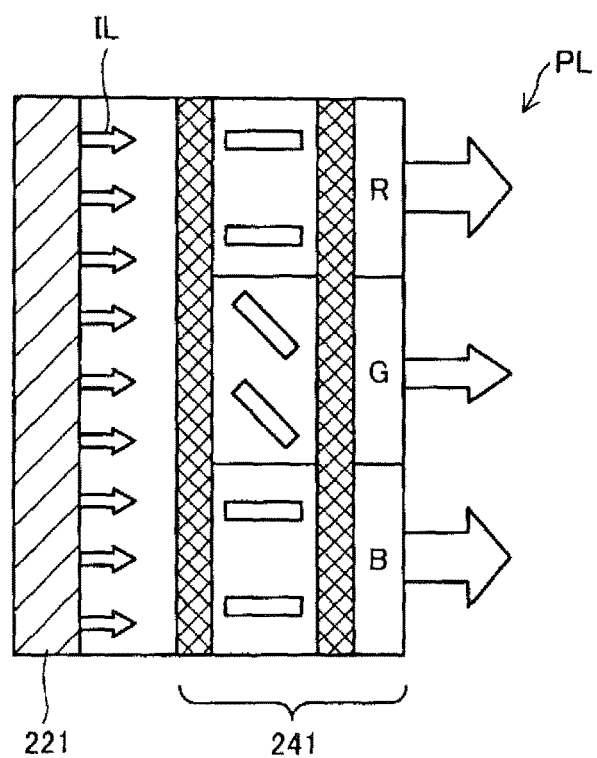
FIG. 3 is a diagram illustrating a state where image light is emitted by an image-light generating unit of a right display driving unit.

FIG. 3 is a diagram illustrating a state where image light is emitted by the image-light generating unit of the right display driving unit 22. The right LCD 241 drives liquid crystal corresponding to positions of the pixels arranged in a matrix shape to change the transmittance of light transmitting through the right LCD 241, thereby modulating illumination light irradiated from the right backlight 221 into effective image light representing an image. In the embodiment, a backlight system is adopted, but image light may be emitted using a frontlight system or a reflection system.

The right projection optical system 251 is configured of a collimate lens that changes image light emitted from the right LCD 241 into light beams in a parallel state. The right light guide plate 261 functioning as the right optical-image display unit 26 guides the image light output from the right projection optical system 251 to the right eye RE of the user while reflecting the image light along a predetermined optical path. As the optical-image display unit, an arbitrary system can be used as long as a virtual image is formed before the eyes of the user using the image light. For example, a diffraction grating may be used or a semitransparent reflection film may be used.

The left display driving unit 24 has the same configuration as the right display driving unit 22. That is, the left display driving unit 24 includes a receiving unit (Rx) 54, the left backlight (BL) control unit 202 and the left backlight (BL) 222 that function as a light source, the left LCD control unit 212 and the left LCD 242 that function as a display element, and the left projection optical system 252. The right display driving unit 22 and the left display driving unit 24 are provided as a pair. Since the units of the left display driving unit 24 have the same configurations and function as the above-described units of the right display driving unit 22, the description thereof will not be made.

Figure 4:
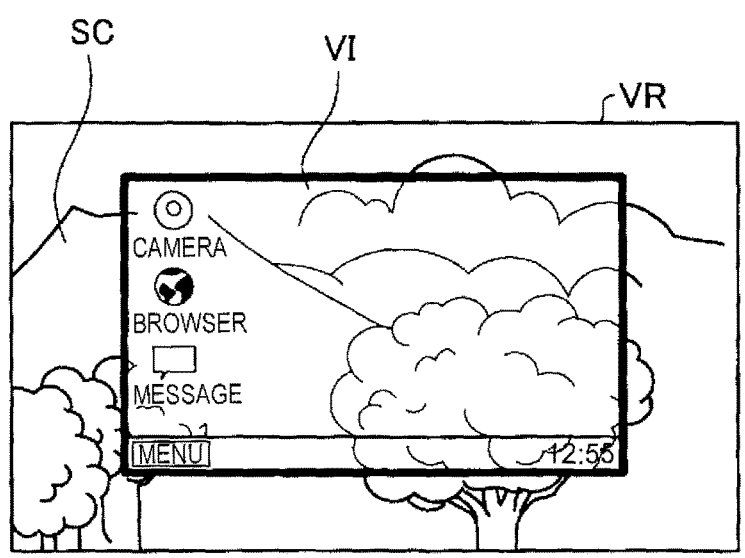
FIG. 4 is a diagram illustrating an example of a virtual image which is recognized by the user through augmented reality processing executed by an AR processing unit.

FIG. 4 is a diagram illustrating an example of a virtual image which is recognized by the user through the augmented reality processing executed by the AR processing unit 142. The image light guided to both the eyes of the user wearing the head mounted display 100 as described above forms an image on the retinas of the user. As a result, the user can visually recognize a virtual image VI. As illustrated in FIG. 4, the virtual image VI is displayed in a visual field VR of the user wearing the head mounted display 100. In a portion of the visual field VR of the user where the virtual image VI is displayed, the user can visually recognize the virtual image VI of the optical-image display unit and can visually recognize an outside scene SC, which is positioned behind the virtual image VI, through the virtual image VI. In a portion of the visual field VR of the user other than the portion where the virtual image VI is displayed, the user can directly see the outside scene SC through the optical-image display unit. Image data for displaying the virtual image VI and the outside scene SC which overlap each other as described above is generated as image data representing additional presentation information for augmenting the outside scene SC recognized by the user, through the augmented reality processing which is executed by the AR processing unit 142 of the head mounted display 100. The image data generated by the AR processing unit 142 is transmitted to the right LCD control unit 211 and the like, and the virtual image VI is displayed on a front region of the user. "Augmenting the outside scene SC" implies adding, deleting, emphasizing, and attenuating information regarding a real-world, that is, regarding the outside scene SC to augment the outside scene SC which is the real world recognized by the user. During the augmented reality processing for generating the image data, the AR processing unit 142 generates the image data for right eye Data1 and the image data for left eye Data2, which are different, to embed the outside scene SC with the additional presentation information. "Embedding the outside scene with the additional presentation information" implies displaying the virtual image VI on a position, which is distant from the user by a predetermined distance, of the outside scene SC recognized by the user, the virtual image VI making the user feel as if the additional presentation information is present. For example, if the virtual image VI visually recognized by the user in FIG. 4 is an apple, image data representing this apple which overlaps a real road included in the outside scene SC is generated through the augmented reality processing, and an image based on this generated image data is displayed as the virtual image VI. As a result, the user can feel as if the apple falls on the road where there is nothing, and the AR processing unit 142 generates, through the augmented-reality processing, the above-described data for right eye and data for left eye for displaying the virtual image VI illustrated in FIG. 4 or the virtual image VI representing the apple on the real outside scene SC to be distant from the user by a predetermined distance and outputs the data.

A-2. Hand Recognition Processing

Figure 5:
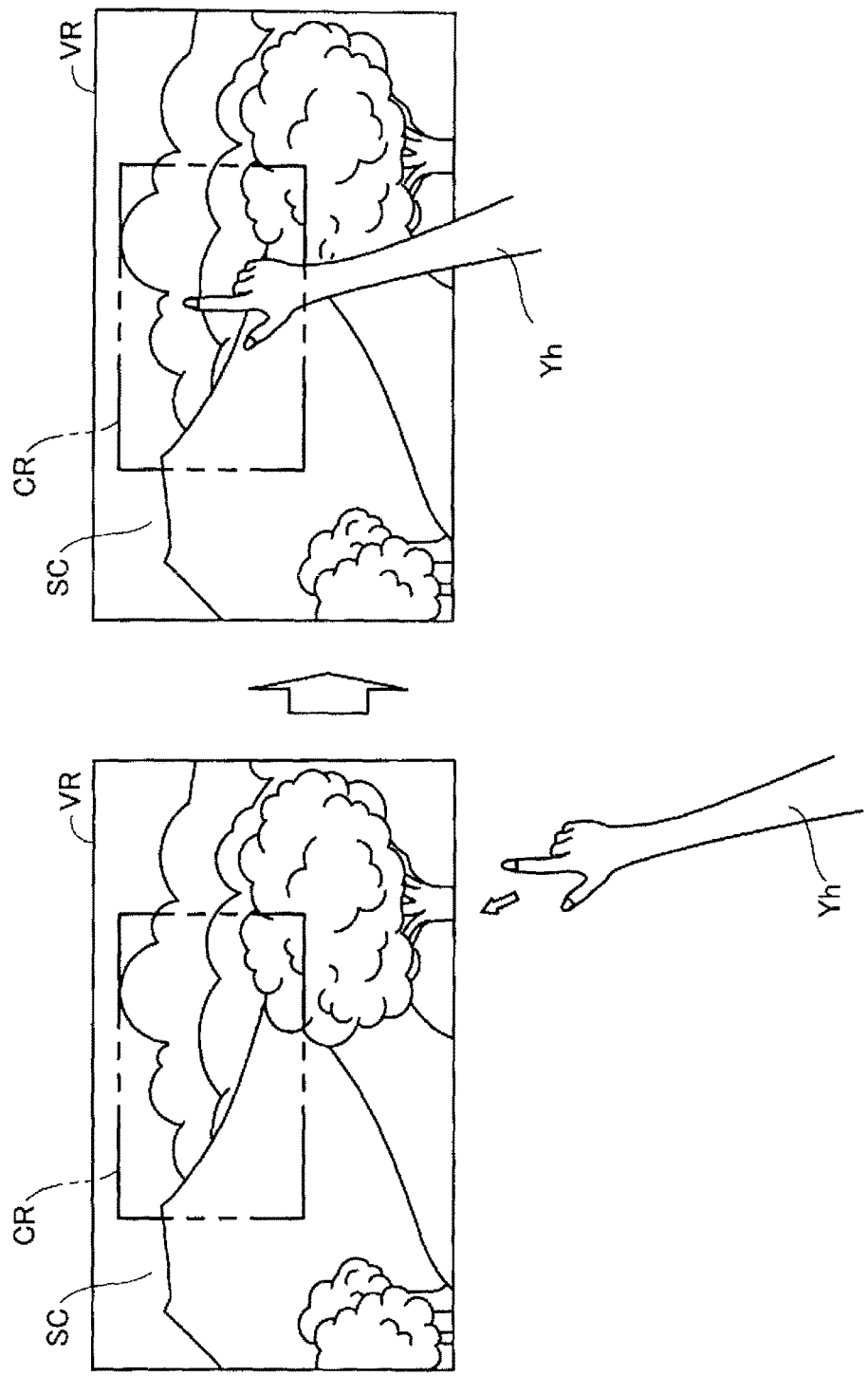
FIG. 5 is a diagram illustrating the summary of hand recognition processing which is executed by a CPU including an image processing unit and the AR processing unit.
Figure 6:
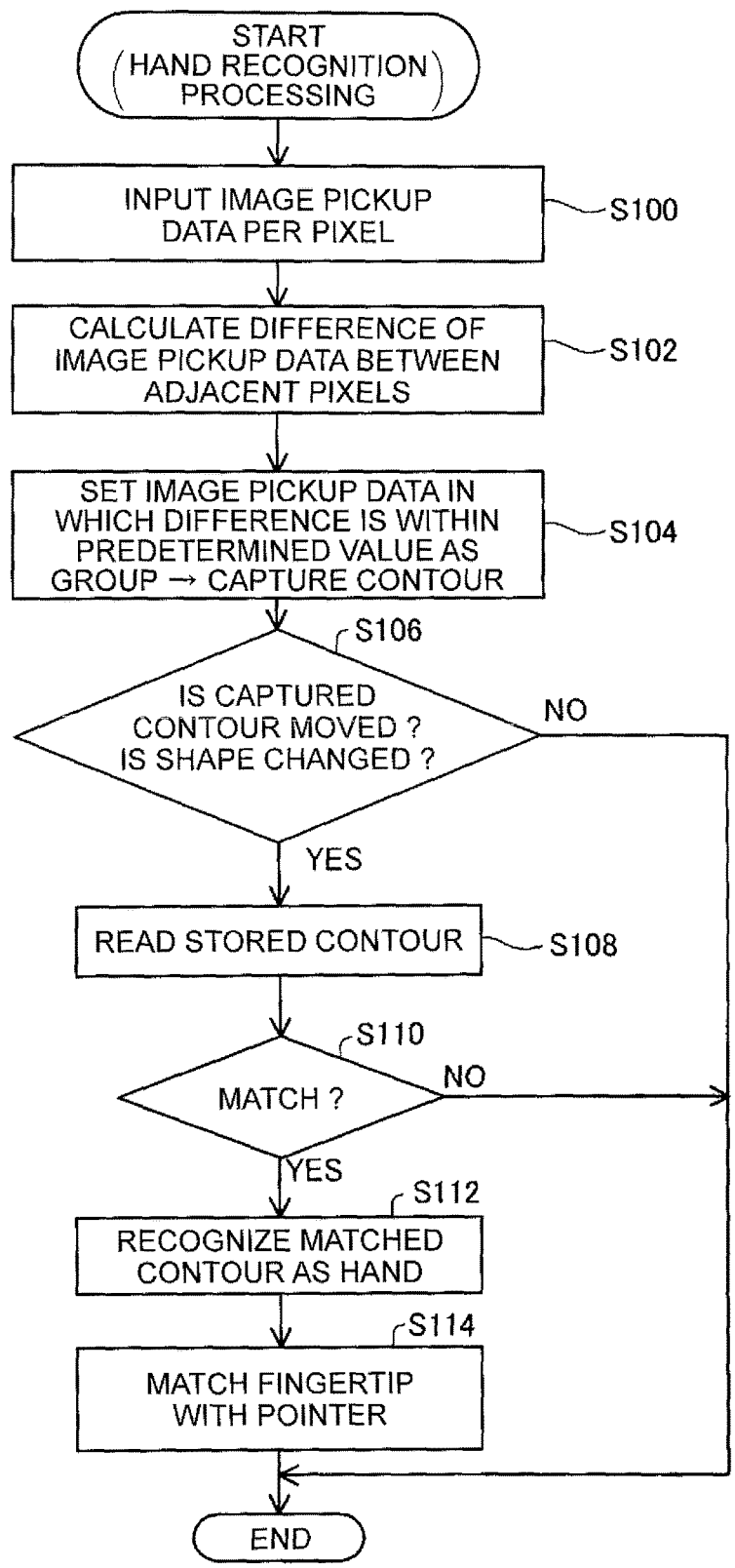
FIG. 6 is a flowchart illustrating the order of the hand recognition processing.

FIG. 5 is a diagram illustrating the summary of hand recognition processing which is executed by the control unit 10 including the image processing unit 160 and the AR processing unit 142. As illustrated in FIG. 1, the head mounted display 100 includes the camera 61 in the image display unit 20. Since the camera is positioned in the middle of the forehead, an image pickup region CR of the camera 61 occupies substantially the center of an information region of the visual field VR as illustrated in FIG. 5. The user recognizes an approximate position occupied by this image pickup region CR based on the camera position and thus can put a hand Yh thereof into the image pickup region CR by its own will. When the user puts the hand Yh into the image pickup region CR, the camera 61 picks up an image of the outside scene SC including the hand Yh and outputs image pickup data corresponding to the individual pixels to the CPU 140. In the case of the outside scene SC of FIG. 5, when the user changes a point of view, a flying bird or a vehicle travelling the road may enter the image pickup region. CR. In addition, for example, when the user wears the head mounted display 100 in a room, a table, a chair, a pet dog or cat, the face of a friend, and the like may enter the image pickup region CR. The camera 61 picks up images of the above-described objects and outputs image pickup data corresponding to the individual pixels to the CPU 140. The head mounted display 100 according to the embodiment determines whether or not an object entering the image pickup region CR is the hand Yh of the user as follows. FIG. 6 is a flowchart illustrating the order of the hand recognition processing.

Figure 7:
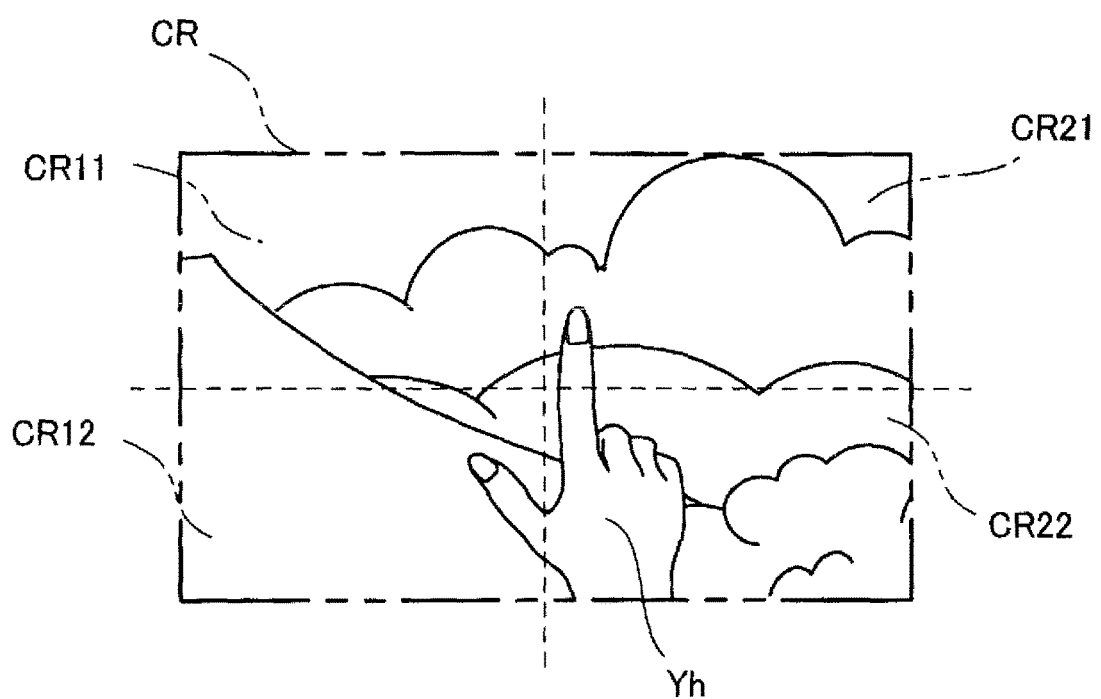
FIG. 7 is a diagram illustrating an input status of image pickup data.
Figure 8:
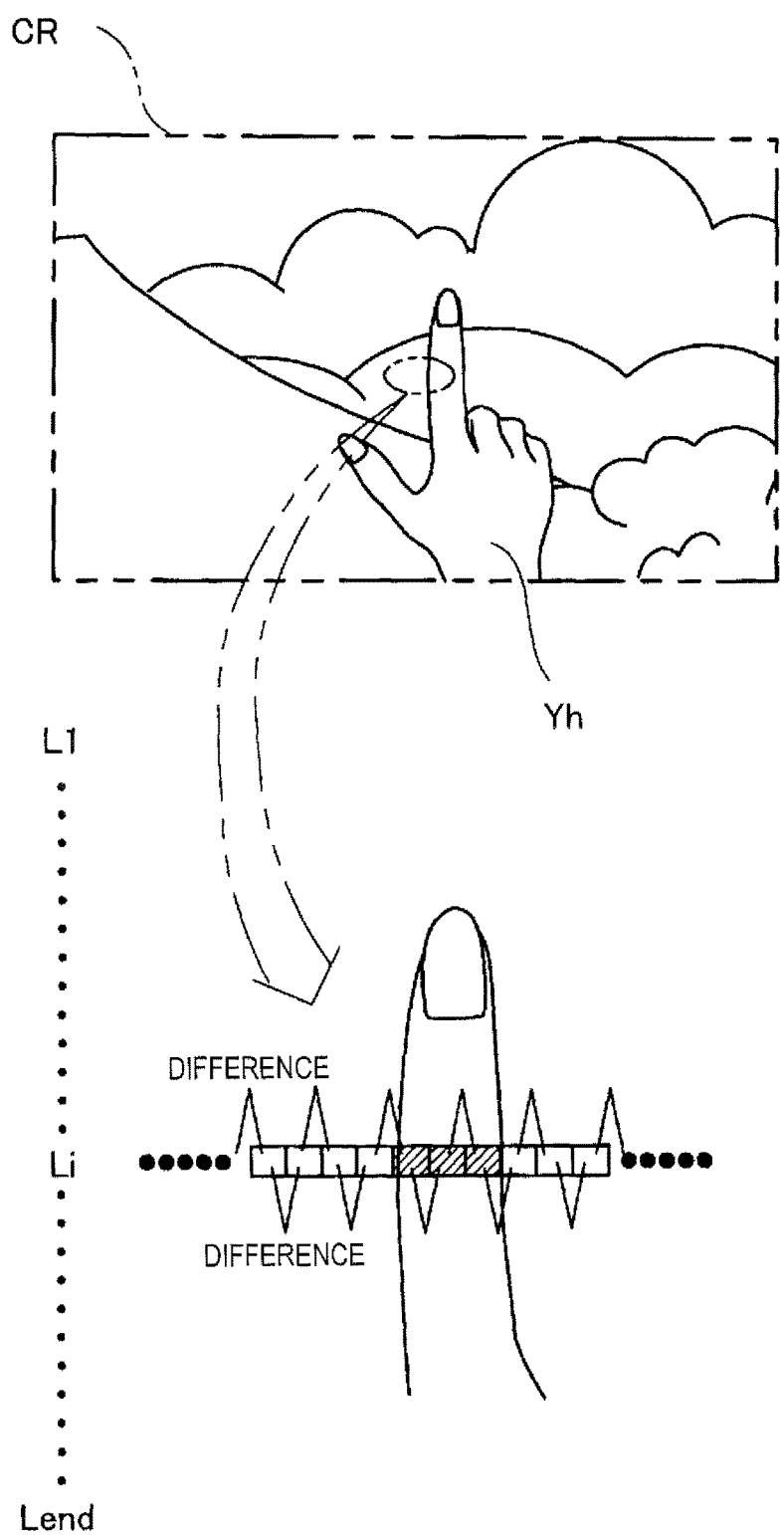
FIG. 8 is a diagram schematically illustrating a state where a difference between adjacent pixels of a part of a hand in an image pickup region is calculated.

This hand recognition processing is repeatedly executed, and the image processing unit 160 receives an input of image pickup data per pixel included in the camera 61 (Step S100). FIG. 7 is a diagram illustrating an input status of the image pickup data. As illustrated in FIG. 7, in the embodiment, the image pickup region CR is vertically and horizontally divided into four divided regions CR11 to CR22, and these divided regions CR11 to CR22 are set as the unit of data input. Moreover, data is input for each divided region while being scanned for each divided region in the horizontal direction by setting an upper left pixel of each divided region as a data input start point and setting a lower right pixel of each divided region as a data input end point. Such scanning input of data is executed in the following order: divided region CR11→CR12→CR21→CR22. When receiving a scanning input of the image pickup data, the image processing unit 160 cancels movement of the head of the user such as tilting or twisting based on sensor outputs from the 9-axis sensor 66. While receiving the scanning input of the image pickup data for each divided region along rows of pixels, the image processing unit 160 calculates a difference in pixel value between colors of adjacent pixels represented by the input image pickup data (Step S102). FIG. 8 is a diagram schematically illustrating a state where a difference in pixel value between adjacent pixels of a part of the hand in the image pickup region CR is calculated.

Figure 9:
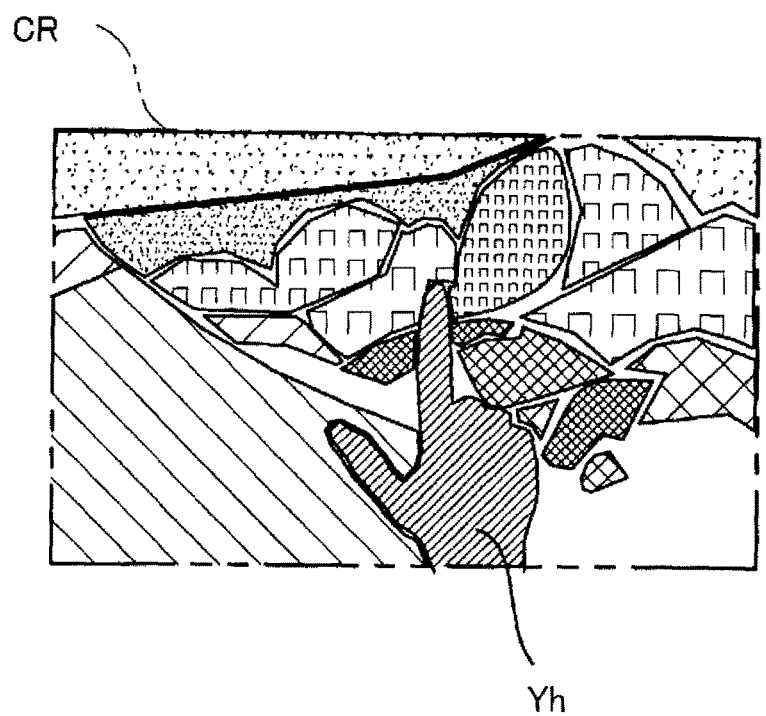
FIG. 9 is a diagram schematically illustrating the results of the difference calculation and grouping in the entire region of the image pickup region.

After the calculation of the difference in pixel value between adjacent pixels, the image processing unit 160 sets a set of image pickup data in which the calculated difference in pixel value is within a predetermined threshold as a group (Step S104). In FIG. 8, in a pixel row Li, a calculated difference in pixel value between adjacent pixels in a range occupied by the hand Yh of the user is within a predetermined threshold. Therefore, this range is set as a group. Such grouping is also performed in pixel rows other than the pixel row Li. The difference between colors of adjacent pixels being within a predetermined threshold has the same meaning as the colors of the adjacent pixels being the same in the threshold range. By the grouping of Step S104, a region with the same color system is distinguished from the other regions. In FIG. 8, the region of the hand Yh of the user is distinguished from the other regions, and thus the contour shape thereof is captured. In addition, in the regions other than the hand Yh of the user in FIG. 8, a difference in pixel value between adjacent pixels is also calculated, and a set of image pickup data in which the calculated difference is within a predetermined threshold is set as a group. FIG. 9 is a diagram schematically illustrating the results of the difference calculation and grouping in the entire region of the image pickup region CR. As illustrated in FIG. 9, for example, if an image of a cloud, a mountain, or a tree having the same color is picked up in an area positioned on the left, right, or upper side of the hand Yh, a set of image pickup data of the cloud, the mountain or the tree in which a calculated difference is within a predetermined threshold is also set as a group. In the embodiment, when a contour shape captured by the above-described grouping is less than the size of the hand Yh of the user which can be imaged by the camera 61, this shape is excluded from an object for shape comparison described below. As a result, a load of calculation required for the shape comparison can be reduced.

Next, the image processing unit 160 compares a contour captured by the grouping of Step S104 during the previous hand recognition processing to a contour captured by the grouping of Step S104 during the present hand recognition processing to determine whether or not the captured contour is moved or whether or not the contour shape is changed (Step S106). For example, in FIG. 8, when the user moves the hand Yh while maintaining the shape of the fingers illustrated in FIG. 8 or when the user bends the thumb, it is determined that the captured contour is moved or the contour shape is changed, and the image processing unit 160 reads a stored hand contour from the hand contour shape storing unit 122 of the storing unit 120 as a comparative shape (Step S108). On the other hand, when the captured contour is not moved or the contour shape is not changed, there is a high possibility that the captured contour is a cloud, a mountain, or a tree in FIG. 8 or an indoor table, an indoor chair, or the like during indoor use. Accordingly, it is determined that the hand recognition after Step S108 is unnecessary, and this routine is finished. In this case, the user may not move the hand Yh after putting the hand Yh into the image pickup region CR. However, since there is a movement when the user puts the hand Yh into the image pickup region CR, YES is determined in Step S106, and the process proceeds to Step S108. Moreover, the determination processing in Step S106 may not be provided, and the stored hand contour which is the comparative shape may be read in Step S108 after the contour capturing in Step S104.

Figure 10:
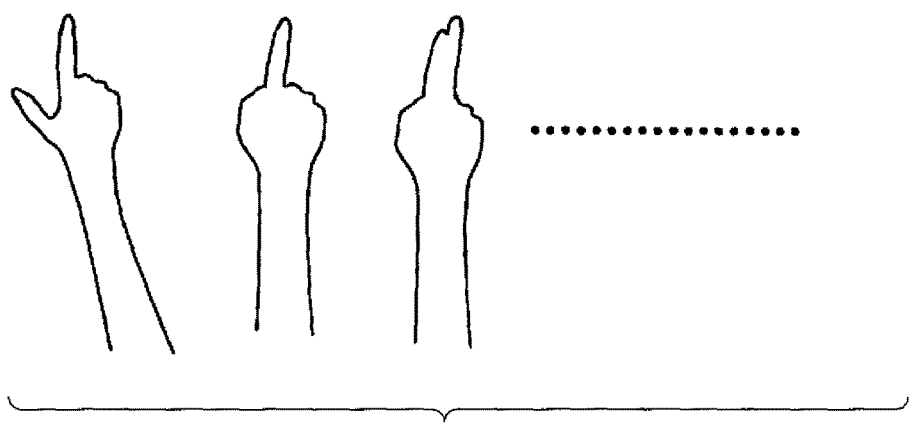
FIG. 10 is a diagram illustrating the summary of hand contours which are stored in a hand contour shape storing unit of a storing unit.
Figure 11:
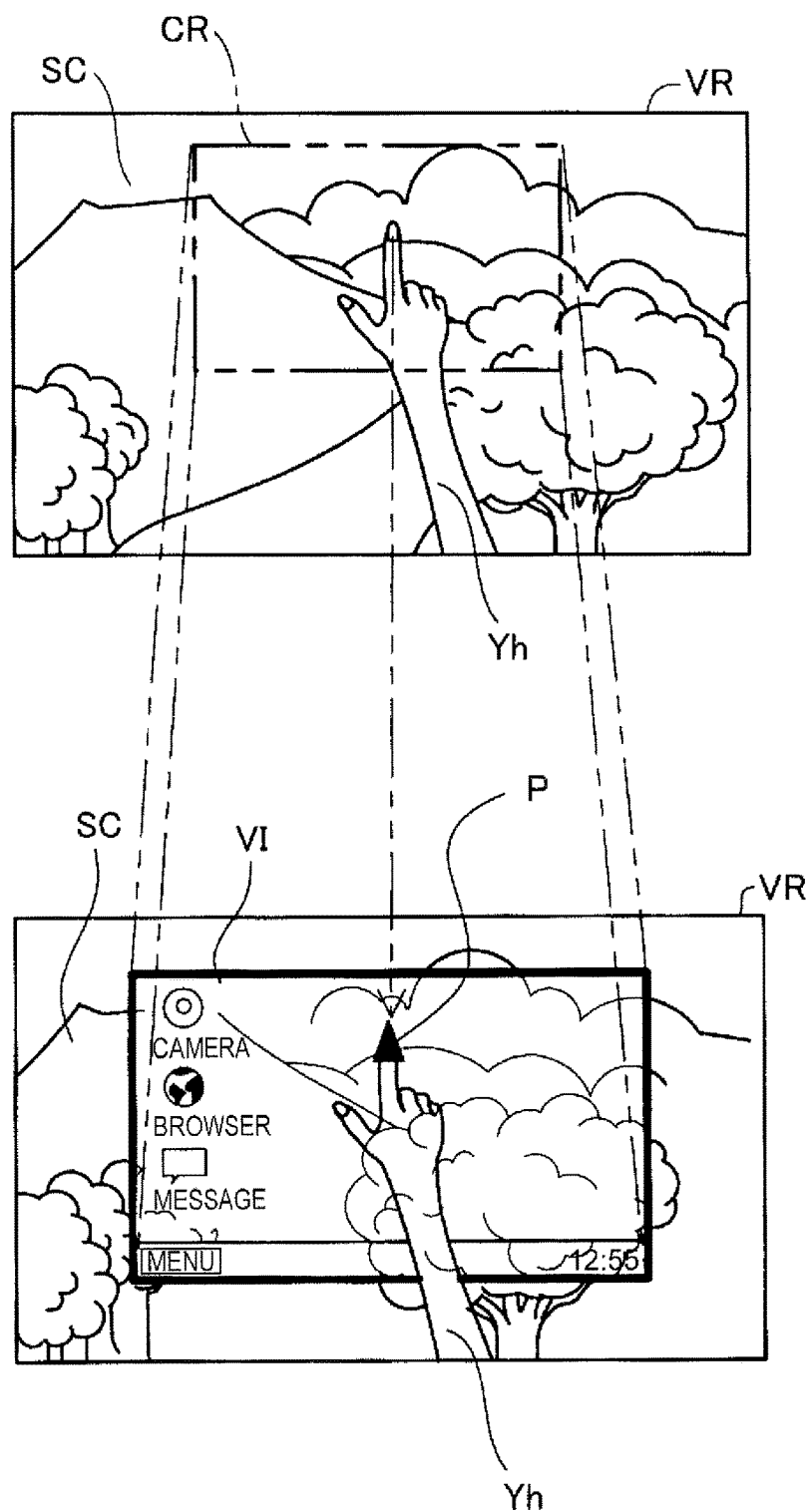
FIG. 11 is a diagram schematically illustrating a state where a virtual image is embedded with a pointer corresponding to a fingertip of a recognized hand of the user.

FIG. 10 is a diagram illustrating the summary of hand contours which are stored in the hand contour shape storing unit 122 of the storing unit 120 as a comparative shape. As illustrated in FIG. 10, in the hand contour shape storing unit 122, data representing a contour of the hand Yh where the thumb is open and the index finger is stretched, data representing a contour of the hand Yh where only the index finger is stretched and the other fingers are bent, data representing a contour of the hand Yh where the index finger and the middle finger are stretched, and the like are stored. These contours are defined and data regarding the contours are generated while preliminarily estimating the shapes of the hand Yh which can be formed when the user puts the hand into the image pickup region CR of the camera 61, and the data are stored in the hand contour shape storing unit 122 in advance. In Step S108 following Step S106, the image processing unit 160 reads the contour data of the hand Yh of FIG. 10 and compares the captured contour of Step S104 to the contours corresponding to the contour data of the hand Yh of FIG. 10 to determine whether or not they match (Step S110). The image processing unit 160 performs this determination using a method such as an unevenness comparison method of comparing unevenness statuses. When it is determined that the contours match, the image processing unit 160 recognizes the determined contour as the hand Yh of the user (Step S112). Next, the image processing unit 160 modifies image data for forming the virtual image VI in cooperation with the AR processing unit 142 and the like such that the virtual image VI is embedded with a pointer P corresponding to a part of the hand Yh, such as a fingertip, of the user recognized in Step S112. Due to the modified image data, the user visually recognizes the virtual image VI including the pointer P (Step S114). FIG. 11 is a diagram schematically illustrating a state where the virtual image VI is embedded with the pointer P corresponding to the fingertip of the recognized hand Yh of the user. The part of the finger of the user corresponding to the pointer P in the virtual image VI is not limited to the fingertip and may be the base of a finger or the middle of a stretched finger in the hand Yh of the user recognized in Step S112.

The image processing unit 160 calculates coordinates of the fingertip of the hand Yh in the image pickup region CR from the rows of the pixels corresponding to the image pickup data output from the camera 61 and calculates fingertip coordinates, which are converted from the above coordinates when the image pickup region CR is modified according to a display rectangle of the virtual image VI, as coordinates of the pointer P. The AR processing unit 142 regenerates (modifies) the image data for forming the virtual image VI such that the pointer P is displayed at the converted coordinates of the virtual image VI. As a result, as illustrated in FIG. 11, the user visually recognizes the virtual image VI including the pointer P. Next, whenever the hand Yh of the user moves in the range of the image pickup region CR, the image processing unit 160 calculates coordinates of the fingertip of the hand Yh and calculates converted coordinates of the pointer in the virtual image VI. In response to this, the AR processing unit 142 updates image data for displaying the virtual image VI along the movement of the fingertip of the hand Yh. Therefore, the AR processing unit 142 allows the user to visually recognize the virtual image VI while moving the pointer P in the virtual image VI.

In the head mounted display 100 according to the embodiment having the above-described configurations, when it is recognized that the hand Yh of the user wearing the head mounted display 100 enters the image pickup region CR of the camera 61 which picks up an image of the front region of the user as illustrated in FIG. 1, the contour shape of the hand Yh which would be imaged by the camera is stored in the hand contour shape storing unit 122. Further, in the head mounted display 100 according to the embodiment, the image pickup data per pixel included in the camera 61 is input (Step S100), the difference between colors of adjacent pixels represented by the input image pickup data is calculated (Step S102), and a set of image pickup data having the same color system in which the calculated difference in pixel value is within a predetermined threshold is set as a group (Step S104: FIGS. 8 to 9). Furthermore, in the head mounted display 100 according to the embodiment, when the contour captured by the grouping is compared to the contour shapes of the hand Yh stored in the hand contour shape storing unit 122 (Step S110). When the contours match, the contour captured by the grouping is recognized as the hand Yh of the user in the image pickup region CR.

As a result, according to the head mounted display 100 of the embodiment, it is not necessary that the model color which is the reference for recognizing the hand of the user be defined for each color of the hand. Therefore, when the hand Yh of the user is recognized, convenience does not deteriorate. In addition, even when the illuminance around the hand of the user is rapidly changed, the respective pixels are substantially equally affected by the rapid change during the calculation of the color difference between adjacent pixels. Therefore, the color difference between adjacent pixels is not affected that much by the rapid change in the illuminance around the hand Yh of the user. Accordingly, according to the head mounted display 100 of the embodiment, a decrease in the recognition accuracy of the hand by the rapid change in the illuminance can be suppressed, and the recognition accuracy can be improved. In addition, the contour shapes of the hand stored in the hand contour shape storing unit 122 are not particularly limited as long as they are expected to be used in the image pickup region CR by the user for a purpose. It is not necessary that the stored contour shapes of the hand be limited to some extent and be newly set depending on the race of a person and the individual users. From this point of view, according to the head mounted display 100 of the embodiment, when the hand Yh of the user is recognized, convenience does not deteriorate, and the versatility of the technique for detecting a hand Yh of the user is improved, and the cost thereof can be reduced.

In the head mounted display 100 according to the embodiment, in a case where the contour captured by the grouping is compared to the contour shapes of the hand Yh stored in the hand contour shape storing unit 122, when the captured contour moves in a predetermined shape change range or when the shape of the captured contour is changed (YES in Step S106), the captured contour is compared to the stored contour shapes of the hand. As a result, the following advantageous effects can be obtained. When the camera picks up images of the front region of the user, the camera may pick up images of other objects in addition to the hand of the user. For example, when the camera confronting the user picks up images of the front region of the user, not only an image of the hand Yh of the user but images of the face and the upper body of the user and motionless objects such as an indoor table and an indoor chair positioned behind the user are picked up. In addition, the camera 61 equipped in the image display unit 20 picks up images of motionless objects such as a cloud, a mountain, and a tree in FIG. 8 or an indoor table or an indoor chair during indoor use. In the case of these motionless objects, contours thereof are not moved and contour shapes are not changed. On the other hand, typically, the user puts the hand Yh into the image pickup region CR for some purposes. Therefore, the hand Yh may be moved in the image pickup region or the shape thereof may be changed without a significant change in position. Accordingly, even when images of motionless objects such as a cloud, a mountain, and a tree in FIG. 8 or an indoor table and an indoor chair during indoor use are picked up, contours are not moved and contour shapes are not changed. Therefore, the captured contours of the motionless objects can be excluded from the comparison with the stored contour shapes of the hand. Thus, according to the head mounted display 100 according to the embodiment, the load of the operation required for hand recognition.

In the head mounted display 100 according to the embodiment, image data for displaying the virtual image VI and the outside scene SC which overlap each other is generated by the AR processing unit 142. Due to this generated image data, the user can recognize the virtual image VI and the outside scene SC which overlap each other such that the virtual image is displayed on the front region of the user. Further, in the head mounted display 100 according to the embodiment, when the hand Yh of the user in the image pickup region CR is recognized, the image data is modified such that the virtual image Vi is embedded with the pointer P corresponding to the fingertip of the recognized hand Yh of the user. Due to the modified image data, the user visually recognizes the virtual image VI including the pointer P (Step S114: FIG. 11). Accordingly, according to the head mounted display 100 of the embodiment, the user can recognize a correspondence between the hand Yh of the user and the pointer P of the virtual image VI.

In the head mounted display 100 according to the embodiment, in a portion where the virtual image VI including the pointer P is displayed, the user visually recognizes the outside scene SC, which is positioned behind the virtual image VI, through the virtual image VI. Accordingly, the virtual image VI is visually recognized by the user so as to be displayed through the hand Yh of the user in the image pickup region CR of the camera 61. As a result, according to the head mounted display 100 of the embodiment, the hand Yh of the user and the virtual image VI which overlap each other are recognized by the user. Therefore, the recognition of the pointer P with respect to the operation of the hand Yh of the user can be improved.

The head mounted display 100 according to the embodiment calculates the coordinates of the fingertip of the recognized hand Yh of the user in the image pickup region CR and converts these coordinates into the coordinates of the pointer P in the virtual image VI to allow the user to visually recognize the virtual image VI including the pointer P (Step S114: FIG. 11). Accordingly, according to the head mounted display 100 of the embodiment, the pointer P is moved in the virtual image VI along the movement of the hand Yh such that the movement of the hand Yh is associated with the movement of the pointer P to be recognized by the user. As a result, the hand Yh of the user can be used for a command operation, and thus convenience can be improved.

In the head mounted display 100 according to the embodiment, when the scanning input of the image pickup data is received, the movement of the head of the user is cancelled based on sensor outputs from the 9-axis sensor 66. Accordingly, according to the head mounted display 100 of the embodiment, the contour having the same color system obtained by the grouping can be accurately captured without depending on the movement of the head of the user. Therefore, the recognition accuracy of the hand of the user can be increased.

A-3. Other Embodiments

Figure 12:
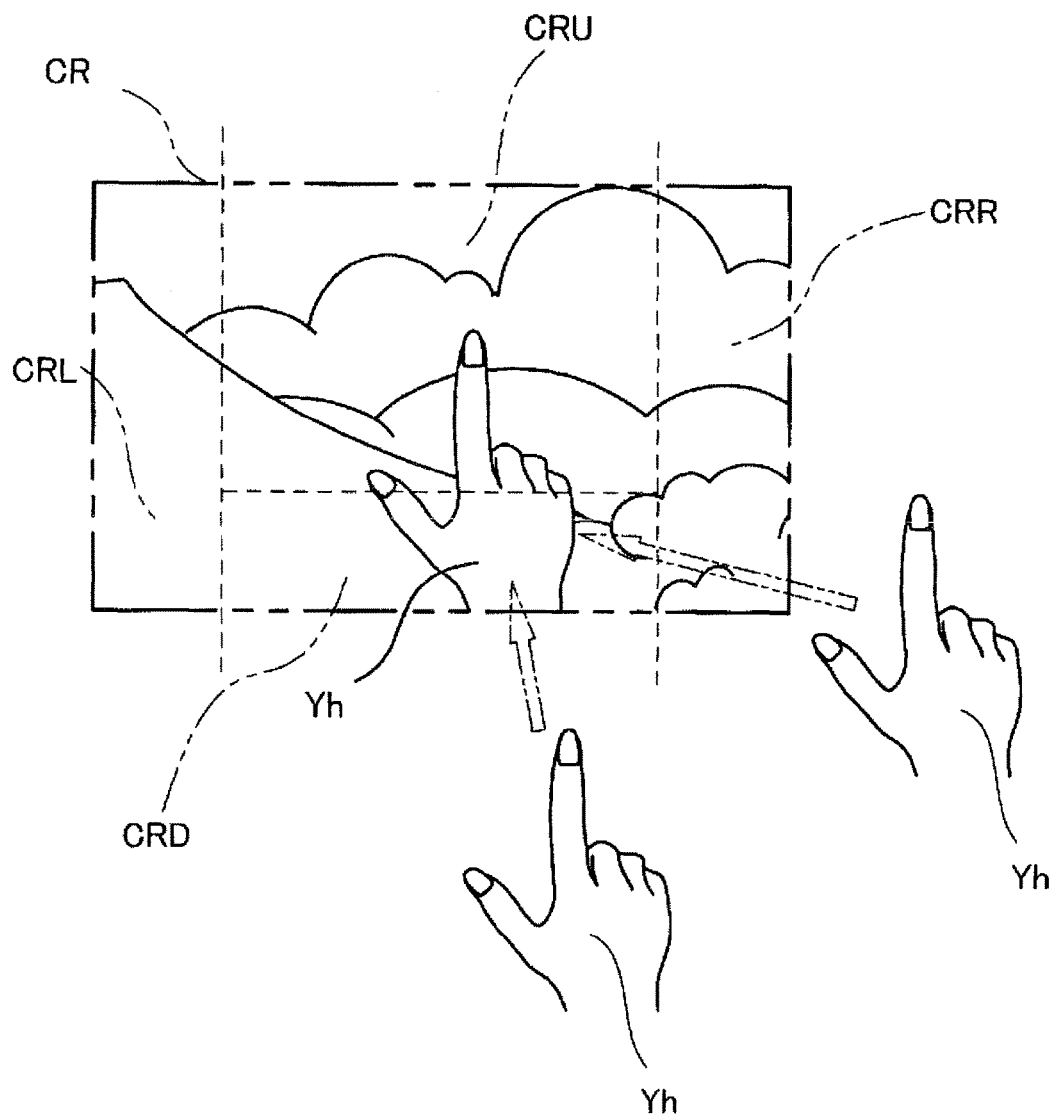
FIG. 12 is a diagram schematically illustrating hand recognition processing which is executed by a head mounted display according to another embodiment of the invention.

The head mounted display 100 can be embodied as follows. FIG. 12 is a diagram schematically illustrating hand recognition processing which is executed by a head mounted display 100 according to another embodiment of the invention. In this embodiment, the scanning input of the image pickup data in Step S100 and the difference calculation in Step S102 subsequent thereto are executed in the execution order determined for each of divided regions into which the image pickup region CR is divided in advance. That is, as illustrated in FIG. 12, the image pickup region CR is divided into a left end region CRL, a right end region CRR, a lower end region CRD, and a residual region CRU in advance, and the scanning input of data in the horizontal direction for each divided region is executed in the following order: the right end region CRR→the lower end region CRD→the left end region CRL. Typically, the user puts the dominant hand Yh into the image pickup region CR of the camera on the side seen from the user. Therefore, when the dominant hand Yh is the right hand, the user puts the hand Yh from the right end region CRR or from the lower end region CRD to the image pickup region CR. In the above-described embodiment, since the fingertip matches with the pointer P, even the user with the left dominant hand is expected to perform the same operation as the user with the right dominant hand. Accordingly, according to the head mounted display 100 having the configuration, the image pickup region CR is divided into the left end region CRL, the right end region CRR, the lower end region CRD, and the residual region CRU in advance, and the scanning input of data is executed in the above-described order. As a result, by associating the execution order determined for each divided region with the operation of putting the hand Yh into the image pickup region CR, the hand Yh can be rapidly recognized, for example, when the hand Yh of the user enters the right end region CRR. Then, the behavior of the hand Yh can be associated with the behavior of the pointer P by the data input in the entire region of the image pickup region CR. In the embodiment, the scanning input of data may be executed in the following order: the lower end region CRD→the right end region CRR→the left end region CRL.

In a head mounted display 100 according to another embodiment of the invention, RGB-based image pickup data to be input in Step S100 is color-converted into HSV color-based data in which the color is represented by hue, saturation, and value. The color difference calculation between adjacent pixels in the next step S102 is replaced with calculation of a difference between values of adjacent pixels obtained by the color conversion. The value obtained by the color conversion of the image pickup data is separated from the brightness affected by the illuminance around the imaged hand Yh of the user during the color conversion into the HSV color system. Therefore, according to the head mounted display 100 of the embodiment using the value obtained by the color conversion into the HSV color system, a decrease in the recognition accuracy by the rapid change in illuminance can be suppressed with higher effectiveness, and the recognition accuracy of the hand Yh can be further increased.

B. Modification Example

In the above-described embodiments, a part of configurations which are implemented by hardware may be implemented by software. Conversely, a part of configurations which are implemented by software may be implemented by hardware. In addition, the following modifications can be made.

Modification Example 1

In the above-described embodiments, the configurations of the head mounted display have been described as an example. However, the configurations of the head mounted display can be arbitrarily made within a range not departing from the scope of the invention. For example, addition, deletion, conversion, and the like can be made for each component.

In the above-described embodiments, the assignment of the components to the control unit and the image display unit is merely exemplary, and various forms can be adopted for the assignment. For example, the following forms can be adopted: (I) a form in which the control unit has processing functions of the CPU, the memory, and the like and the image display unit has only the display function; (ii) a form in which both the control unit and the image display unit have processing functions of the CPU, the memory, and the like; (iii) a form in which the control unit and the image display unit are integrated (for example, a form in which the image display unit includes the control unit and functions as a glasses-type wearable computer); (iv) a form in which a smartphone or a portable game machine is used instead of the control unit; and (v) a form in which the connecting unit (cord) is not provided by configuring the control unit and the image display unit to be capable of radio communication and wireless power supply.

In the above-described embodiments, for convenience of explanation, the control unit includes the transmitting units, and the image display unit includes the receiving units. However, both of the transmitting units and the receiving units in the above-described embodiments have a function for enabling bidirectional communication and can function as transmitting and receiving units. In addition, for example, the control unit illustrated in FIG. 2 is connected to the image display unit through a wired signal transmission line. However, the control unit and the image display unit may be connected through a wireless signal transmission line such as a wireless LAN, infrared communication, or Bluetooth (registered trademark).

For example, the configurations of the control unit and the image display unit illustrated in FIG. 2 can be arbitrarily changed. Specifically, for example, the touch pad may be removed from the control unit and the control unit may be configured to be operated by only the cross key. In addition, the control unit may include another manipulation interface such as a manipulation stick. The control unit may be configured to be connected with devices such as a keyboard or a mouse. The control unit may receive an input from the keyboard and the mouse. In addition, for example, a manipulation input may be acquired not only from the touch pad and the cross key but from a foot switch (manipulation switch using a foot of the user). In addition, if a manipulation input can be acquired from the foot switch or from the visual line of the user, the input-information acquiring unit can acquire the manipulation input from the user during an operation in which it is difficult for the user to use the hands.

For example, the head mounted display is the transmissive head mounted display of the binocular type. However, the head mounted display may be a head mounted display of a monocular type. The head mounted display may be configured as a non-transmissive head mounted display in which transmission of an outside scene is blocked in a state in which the user wears the head mounted display.

Figure 13A:
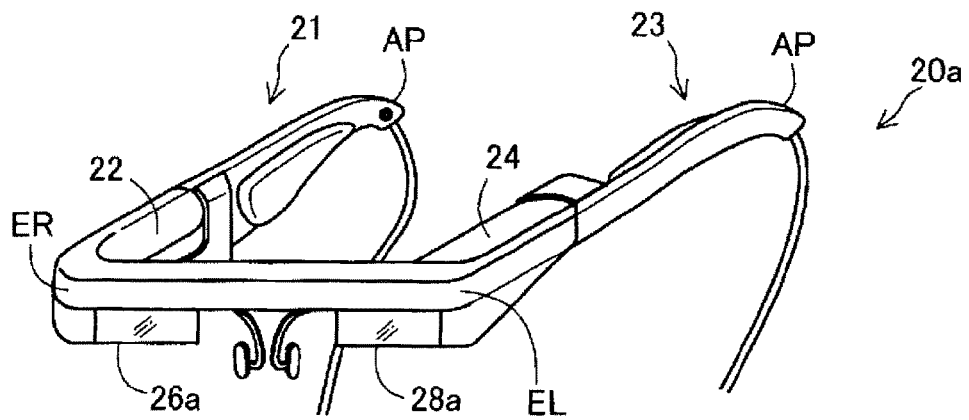
FIGS. 13A and 13B are diagrams illustrating a configuration of an external appearance of a head mounted display according to a modification example of the invention.
Figure 13B:
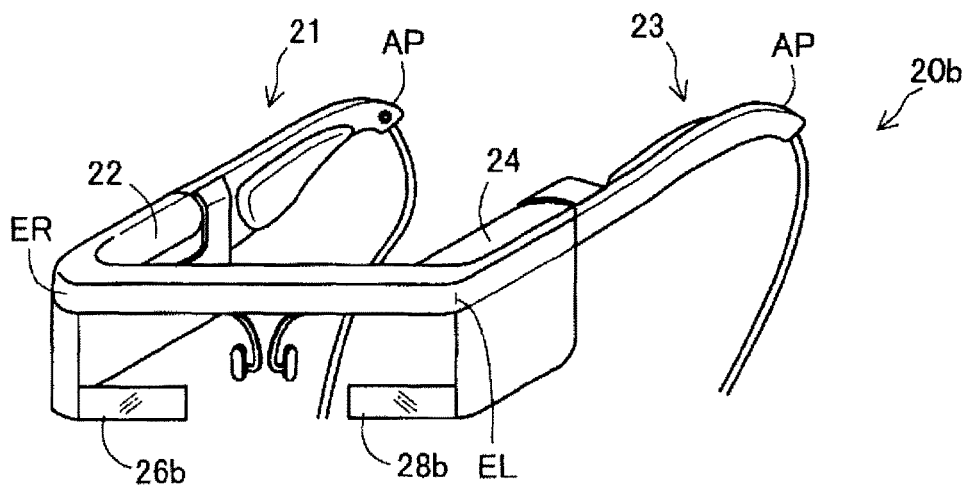

FIGS. 13A and 13B are diagrams illustrating a configuration of an external appearance of a head mounted display according to a modification example of the invention. An example of FIG. 13A is different from the head mounted display 100 illustrated in FIG. 1, in that an image display unit 20a includes a right optical-image display unit 26a instead of the right optical-image display unit 26 and includes a left optical-image display unit 28a instead of the left optical-image display unit 28. The right optical-image display unit 26a is formed to be smaller than the optical members illustrated in FIG. 1 and is arranged obliquely above the right eye when the user wears the head mounted display. Likewise, the left optical-image display unit 28a is formed to be smaller than the optical members illustrated in FIG. 1 and is arranged obliquely above the left eye when the user wears the head mounted display. An example of FIG. 13B is different from the head mounted display 100 illustrated in FIG. 1, in that an image display unit 20b includes a right optical-image display unit 26b instead of the right optical-image display unit 26 and includes a left optical-image display unit 28b instead of the left optical-image display unit 28. The right optical-image display unit 26b is formed to be smaller than the optical members illustrated in FIG. 1 and is arranged obliquely below the right eye when the user wears the head mounted display. Likewise, the left optical-image display unit 28b is formed to be smaller than the optical members illustrated in FIG. 1 and is arranged obliquely below the left eye when the user wears the head mounted display. In this way, the optical-image display units only need to be arranged near the eyes of the user. In addition, the size of the optical members which form the optical-image display units is arbitrary. A head mounted display having a configuration in which the optical-image display units cover only a part of the eyes of the user, that is, a configuration in which the optical-image display units do not completely cover the eyes of the user may also be implemented.

For example, the functional units such as the image processing unit, the display control unit, the AR processing unit, and the sound processing unit have been described as being implemented by the CPU loading the computer program, which is stored in the ROM or the hard disk, on the RAM and executing the computer program. However, the functional units may be configured using an Application Specific Integrated Circuit (ASIC) designed to implement the functions of the functional units.

For example, in the above-described embodiments, the image display unit of the head mounted display is worn like eyeglasses. However, the image display unit may be a normal flat display apparatus (for example, a liquid crystal display apparatus, a plasma display apparatus, or an organic EL display apparatus). In this case, the control unit and the image display unit may be connected through a wired signal transmission line or may be connected through a wireless signal transmission line. With such a configuration, the control unit can be used as a remote controller for the normal flat display apparatus.

Instead of the image display unit worn like eyeglasses, an image display unit having another shape such as an image display unit worn like a cap may be adopted as the image display unit. Further, an ear-hang type or a headband type may be adopted as the earphones, or the earphones may not be provided. In addition, for example, the head mounted display may be configured as a head-up display (HUD) which is mounted to vehicles such as automobiles or airplanes. In addition, for example, a head mounted display equipped with a body protector such as a helmet may also be adopted.

For example, in the above-described embodiments, the secondary battery is used as the power supply. However, the power supply is not limited to the secondary battery, and various batteries can be used. For example, a primary battery, a fuel battery, a solar battery, a thermal battery, and the like may be used.

In the above-described embodiments, for example, the image-light generating unit is configured using the backlights, the backlight control units, the LCDs, and the LCD control units. However, the above-described configuration is merely exemplary. The image-light generating unit may include components for implementing another system together with these components or instead of these components. For example, the image-light generating unit may include an Organic Electro-Luminescence (EL) display and an organic-EL control unit. In addition, for example, the image-light generating unit may use a digital micromirror device instead of LCD. In addition, for example, the invention can also be applied to a head mounted display apparatus of a laser retinal projection type.

Other Modification Examples

In the AR processing unit, an outside scene image obtained by the camera in the visual field direction of the user may undergo pattern-matching using a pixel parallactic angle to implement the augmented-reality processing. Specifically, the image display unit includes a right eye camera and a left eye camera. The right eye camera is arranged at a position of the image display unit corresponding to the right eye of the user so as to pick up images of an outside scene in the front direction of the image display unit. The left eye camera is arranged at a position of the image display unit corresponding to the left eye of the user so as to pick up an image of an outside scene in the front direction of the image display unit. The AR processing unit may calculate a deviation amount between a target object (which is a target for displaying additional presentation information in a region around the target) included in the image picked up by the right eye camera and a target object included in the image picked up by the left eye camera and may determine "a target distance", which is a display position of the virtual image VI in the augmented-reality processing, using the deviation amount and the pixel parallactic angle.

The AR processing unit may execute the above-described augmented-reality processing only when predetermined conditions are satisfied. For example, the AR processing unit may execute the above-described augmented-reality processing only when the image display unit has a configuration in which a visual line direction of the user can be detected, and when the detected visual line direction satisfies at least one of the following conditions.

Figure 14:
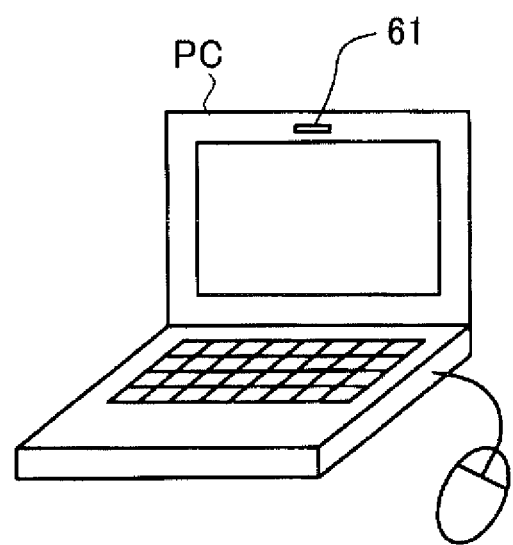
FIG. 14 is a diagram illustrating the summary of an image processing apparatus which recognizes a hand of the user.

- In a viewing angle range in which a horizontal angle is 200° and a vertical angle is 125° (an angle in the down direction is 75° and an angle in the up direction is 50°)
- In a viewing angle range in which a horizontal angle is 30° and a vertical angle is 20°, which is an effective visual field where an information receiving capability is superior
- In a viewing angle range in which a horizontal angle is 60° to 90° and a vertical angle is 45° to 70°, which is a stable point-of-regard field where a point of regard is rapidly and stably observed In a viewing angle range from a horizontal angle of 20°, at which self-motion perception (vection) starts to be induced on an image, to a horizontal angle of 110° at which self-motion perception is saturated In addition, a modification example having a hand recognition configuration in which the augmented-reality processing is not performed can be adopted. FIG. 14 is a diagram illustrating the summary of an image processing device which recognizes a hand of the user. As illustrated in FIG. 14, in this modification example, a personal computer PC is used, and the camera 61 of the head mounted display 100 according to the above-described embodiment is used as the camera 61 built in the personal computer PC. A camera which is separately provided from the computer may be connected to the personal computer PC. In this modification example, the personal computer PC includes the control unit 10 illustrated in FIG. 2 from which the configurations relating to the augmented-reality processing are excluded. In the image processing device including the personal computer PC, images of the front region of the user positioned before the personal computer PC are picked up by the camera 61, and the hand Yh of the user in an image pickup region of the camera 61 is recognized in the same manner as the above-described head mounted display 100.

In addition, in the head mounted displays 100 according to the above-described embodiments, when the hand Yh of the user in the image pickup region CR is recognized, the calculation of the difference in pixel value between adjacent pixels to which data is input per pixel included in the camera 61 is executed (Step S102). However, in a peripheral region including a picked-up image of a contour capturing target object which is picked up in the image pickup region CR, the calculation of the difference in pixel value between adjacent pixels may be executed. Alternatively, a difference calculation of data may be performed on colors obtained from pixels in the above peripheral region. In the difference calculation on pixels in the above peripheral region, images of motionless objects such as a cloud, a mountain, and a tree illustrated in FIG. 8 can be excluded from the contour shape capturing target which undergoes the difference calculation. Accordingly, a calculation load is reduced.

The invention is not limited to the above-described embodiments, examples, and modification examples, and various configurations can be made within a range not departing from the scope of the invention. For example, the technical features of the embodiments, the examples, and the modification examples, which correspond to the technical features of each configuration described in "SUMMARY", can be appropriately substituted or combined with other features to solve a part or all the above-described problems or to achieve a part or all the above-described effects. In addition, unless described as being essential in this specification, these technical features may be appropriately deleted.

The entire disclosure of Japanese Patent Application No. 2013-177861, filed Aug. 29, 2013 is expressly incorporated by reference herein.

What is claimed is:

1. An image processing device for recognizing a hand of user in an image pickup region of a camera which picks up an image of a front side of the user, the device comprising:
   a difference calculating unit that receives an input of a picked-up image composed of a plurality of data included in the camera, calculates a difference between the data of the picked-up image, and executes the difference calculation between the data in at least a part of the image pickup region, wherein the data of the picked-up image is color-converted into HSV color-based data in which color is re resented by hue, saturation and value, and the difference calculation is between adjacent pixels and is a calculation of a difference between values of adjacent pixels obtained by the color conversion, and the value obtained by the color conversion of the data of the picked-up image is separated from a brightness affected by the illuminance around an imaged hand of a user during the color conversion into an HSV color system;
   a capturing unit that captures a shape of a region, where the difference calculated by the difference calculating unit is within a predetermined threshold, as a recognition target shape;
   a storing unit in which a contour shape of the hand is stored in advance as a comparative shape of the captured recognition target shape;
   an unevenness comparison unit that compares captured contours to the contour shape of the hand being stored in the storage unit, the contour shape of the hand being stored in advance and being a predetermined shape, the comparison occurring after the capturing of the contours, wherein the contour shape of the hand being stored in the storage unit has data representing a plurality of configurations relating to an orientation of the hand; and
   a recognizing unit that compares the recognition target shape captured by the capturing unit to the contour shape stored in the storing unit and recognizes the captured recognition target shape as the hand of the user in the image pickup region based on a comparison result,
   wherein a pointer is provided based upon converted coordinates when the image pickup region is modified based upon a virtual image, and displayed at converted coordinates of the virtual image so as to correspond to a point on a user's hand.

2. The image processing device according to claim 1, wherein the capturing unit captures a shape of a region, where the difference in pixel value between the adjacent pixels is within a predetermined threshold, as the recognition target shape.

3. A head mounted display apparatus in which the virtual image and an outside scene overlap each other and can be visually recognized by the user, the apparatus comprising:
   an augmented-reality processing unit that generates image data for displaying the virtual image and allows the user to visually recognize the virtual image such that the virtual image is displayed in a visual field of the user based on the generated image data;
   the image processing device according to claim 2; and
   the camera that can pick up an image of the hand of the user,
   wherein the augmented-reality processing unit allows the user to visually recognize the virtual image in a display region corresponding to the image pickup region, and when the recognizing unit of the image processing device recognizes the hand of the user in the image pickup region, the augmented-reality processing unit generates the image data for displaying the virtual image, which is embedded with a partial hand image corresponding to at least a part of the recognized hand of the user, and updates a position of the partial hand image in the display region of the virtual image based on a position of the part of the hand in the image pickup region.

4. A head mounted display apparatus in which the virtual image and an outside scene overlap each other and can be visually recognized by the user, the apparatus comprising:
- an augmented-reality processing unit that generates image data for displaying the virtual image and allows the user to visually recognize the virtual image such that the virtual image is displayed in a visual field of the user based on the generated image data;
- the image processing device according to claim 1; and
- the camera that can pick up an image of the hand of the user,
- wherein the augmented-reality processing unit allows the user to visually recognize the virtual image in a display region corresponding to the image pickup region, and
- when the recognizing unit of the image processing device recognizes the hand of the user in the image pickup region, the augmented-reality processing unit generates the image data for displaying the virtual image, which is embedded with a partial hand image corresponding to at least a part of the recognized hand of the user, and updates a position of the partial hand image in the display region of the virtual image based on a position of the part of the hand in the image pickup region.

5. The head mounted display apparatus according to claim 4,
- wherein the augmented-reality processing unit generates the image data such that the virtual image including the partial hand image is displayed through the hand of the user positioned inside the image pickup region of the camera.

6. The head mounted display apparatus according to claim 4, further comprising
- a head behavior detecting sensor that detects behavior of the head of the user,
- wherein the difference calculating unit of the image processing device receives an input of the picked-up image from the camera in a state where a movement of the head detected by the head behavior detecting sensor is cancelled.

7. The image processing device according to claim 1, wherein the stored contour shape of the hand includes at least one of data representing a contour of the hand where a thumb is open and an index finger is stretched, data representing a contour of the hand where only the index finger is stretched and other fingers are bent, and data representing a contour of the hand where the index finger and a middle finger are stretched.

8. The image processing device according to claim 1,
- wherein the difference calculating unit executes the difference calculation on the divided regions in an execution order determined for each of divided regions into which the image pickup region is divided in advance.

9. The image processing device according to claim 8,
- wherein the divided regions are a left end region, a right end region, a lower end region, a residual region of the image pickup region, and
- the difference calculating unit executes the difference calculation first on any one of the left end region, the right end region, and the lower end region.

10. A head mounted display apparatus in which the virtual image and an outside scene overlap each other and can be visually recognized by the user, the apparatus comprising:
- an augmented-reality processing unit that generates image data for displaying the virtual image and allows the user to visually recognize the virtual image such that the virtual image is displayed in a visual field of the user based on the generated image data;
- the image processing device according to claim 9; and
- the camera that can pick up an image of the hand of the user,
- wherein the augmented-reality processing unit allows the user to visually recognize the virtual image in a display region corresponding to the image pickup region, and
- when the recognizing unit of the image processing device recognizes the hand of the user in the image pickup region, the augmented-reality processing unit generates the image data for displaying the virtual image, which is embedded with a partial hand image corresponding to at least a part of the recognized hand of the user, and updates a position of the partial hand image in the display region of the virtual image based on a position of the part of the hand in the image pickup region.

11. A head mounted display apparatus in which the virtual image and an outside scene overlap each other and can be visually recognized by the user, the apparatus comprising:
- an augmented-reality processing unit that generates image data for displaying the virtual image and allows the user to visually recognize the virtual image such that the virtual image is displayed in a visual field of the user based on the generated image data;
- the image processing device according to claim 8; and
- the camera that can pick up an image of the hand of the user,
- wherein the augmented-reality processing unit allows the user to visually recognize the virtual image in a display region corresponding to the image pickup region, and
- when the recognizing unit of the image processing device recognizes the hand of the user in the image pickup region, the augmented-reality processing unit generates the image data for displaying the virtual image, which is embedded with a partial hand image corresponding to at least a part of the recognized hand of the user, and updates a position of the partial hand image in the display region of the virtual image based on a position of the part of the hand in the image pickup region.

* * * * *